US011268475B2

(12) United States Patent
Fjellanger

(10) Patent No.: US 11,268,475 B2
(45) Date of Patent: Mar. 8, 2022

(54) CYLINDER HEAD FOR A COMBUSTION ENGINE, AND A METHOD FOR SUPPLY OF PRECHAMBER GAS IN A CYLINDER HEAD

(71) Applicant: Bergen Engines AS, Hylkje (NO)

(72) Inventor: Henrik Fjellanger, Nyborg (NO)

(73) Assignee: BERGEN ENGINES AS, Hylkje (NO)

( * ) Notice: Subject to any disclaimer, the term of this patent is extended or adjusted under 35 U.S.C. 154(b) by 0 days.

(21) Appl. No.: 17/278,001

(22) PCT Filed: Sep. 18, 2019

(86) PCT No.: PCT/NO2019/050188
§ 371 (c)(1),
(2) Date: Mar. 19, 2021

(87) PCT Pub. No.: WO2020/060416
PCT Pub. Date: Mar. 26, 2020

(65) Prior Publication Data
US 2021/0372344 A1    Dec. 2, 2021

(30) Foreign Application Priority Data
Sep. 20, 2018   (NO) .................................. 20181224

(51) Int. Cl.
*F02F 1/42*          (2006.01)
(52) U.S. Cl.
CPC .................................. *F02F 1/4235* (2013.01)
(58) Field of Classification Search
CPC ............... F02M 26/20; F02M 21/0239; F02M 21/0242; F02B 1/04; F02F 1/24; F02D 19/0647
(Continued)

(56) References Cited

U.S. PATENT DOCUMENTS 4,328,781 A * 5/1982 Morita .................... F02M 26/41
                                                 123/184.39
5,351,668 A * 10/1994 Gatellier ................ F02M 26/20
                                                 123/568.13
(Continued)

FOREIGN PATENT DOCUMENTS

CN        202926461 U    5/2013
CN        203847264 U    9/2014
(Continued)

*Primary Examiner* — Long T Tran
*Assistant Examiner* — James J Kim
(74) *Attorney, Agent, or Firm* — Flener IP & Business Law; Zareefa B. Flener

(57) ABSTRACT

The invention relates to a cylinder head (10) for a combustion engine, where the cylinder head (10) comprises one or more gas channels (18*a*, 18*b*) with a gas connection (20) to receive gas and which is connected with one or more valves (14,16) for control of gas supply and gas admission, where said one or more valves (14,16) are fitted on or in the cylinder head (10). The cylinder head (10) comprises an internal gas channel (18*a*, 18*b*) that runs from the gas connection (20) and internally in the cylinder head (10) to said one or more valves (14,16). Also described is a method for supply of prechamber gas in a cylinder head (10) belonging to a combustion engine, in which gas is led through an internal boring (22) that is connected with a gas channel (18*a*) integrated internally in the cylinder head (10), where the internal boring (22) runs into an prechamber (26) in the cylinder head (10).

12 Claims, 3 Drawing Sheets

(58) Field of Classification Search
USPC .................................................... 123/193.5
See application file for complete search history.

(56) References Cited

U.S. PATENT DOCUMENTS

| | | | |
|---|---|---|---|
| 5,690,081 A | | 11/1997 | Kwiatkowski |
| 5,775,309 A | | 7/1998 | Burrahm |
| 6,102,014 A | * | 8/2000 | Donaldson .......... F02D 13/0276 123/568.12 |
| 8,757,127 B2 | * | 6/2014 | Ishida .................... F02B 19/18 123/254 |
| 2011/0272045 A1 | * | 11/2011 | Matsukawa ........... F02D 19/066 137/511 |
| 2015/0316190 A1 | | 11/2015 | Devani et al. |

FOREIGN PATENT DOCUMENTS

| | | |
|---|---|---|
| CN | 104696117 A | 6/2015 |
| DE | 10062169 A1 | 6/2002 |
| EP | 1550801 A1 | 6/2005 |
| EP | 2818673 A1 | 12/2014 |
| JP | H0610672 A | 1/1984 |
| JP | S59158363 U | 9/1984 |
| JP | S6231737 U | 2/1987 |
| JP | 2003138917 A | 5/2003 |
| WO | 9112418 A1 | 8/1991 |
| WO | 2016046451 A1 | 3/2016 |

* cited by examiner

CYLINDER HEAD FOR A COMBUSTION ENGINE, AND A METHOD FOR SUPPLY OF PRECHAMBER GAS IN A CYLINDER HEAD

FIELD OF THE INVENTION

The present invention relates to a cylinder head for a combustion engine, where the cylinder head comprises one or more gas channels with a gas connection to receive gas that is connected with one or more valves for control of gas supply and gas admission, where said one or more valves are fitted on or in the cylinder head. The invention relates further to a method for supply of prechamber gas in a cylinder head of a combustion engine.

DESCRIPTION OF PRIOR ART

EP1550801 A1 describes a cylinder head with an embedded gas channel that runs from an outer connection to the inlet channel of the engine.

CN202926461 U shows a gas channel integrated into a cylinder head.

CN203847264 U describes a cylinder head of a gas engine, where at least parts of a gas channel appear to be integrated into the cover, and in connection with a gas valve.

From the above mentioned documents, an embedded gas channel seems to appear, but that has another function than the present invention.

Furthermore, reference is made to US 2011/0272045 A1 that shows a unit which is not specifically a cylinder head, but the unit is used to couple together two different fuels from two different tanks before they are sent further to a carburettor or an injection part of an engine. The unit has several valves that are connected to an embedded channel, and which can regulate the supply of fuel.

U.S. Pat. No. 5,775,309 A describes a cast part with inlet and outlet for gas channels intended for fuels. Also described is that there are one or more valves connected to the gas channel that can adjust the gas flow. The cast part is not described as a cylinder head, only as a separate housing with gas channels and valves. This housing can, for example, be placed in connection with a carburettor.

EP 2818673 A1 shows a unit that contains a valve which is inside the unit. The valve shown is connected to channels and is set up to be able to change supply of fuels when required.

US 2015/0316190 A1 shows a manifold with two embedded channels. It is not described that any valves are coupled to the channels to regulate, for example, the flow of natural gas.

OBJECTS OF THE PRESENT INVENTION

It is an object of the invention to provide an embedded gas channel, which binds together a gas control valve with gas inlet and gas admission valve to obtain a compact, integrated gas system inside a cylinder head of a gas engine.

Furthermore, it is an object to provide a cylinder head of a gas engine that gives one or more of the following advantages: Simplified design and mounting of gas pipes, gives increased gas safety, reduced component costs, reduced mounting time, increased safety of operations and increased service friendliness.

By embedding the gas channel(s) in the cylinder head, much advanced welding with high costs and risk for errors are avoided. A cast operation has relatively considerably lower costs and reduced complexity.

One object is also to provide gas valves and feeding pipes that are integrated in the cylinder head of the engine as a separate sub-system with the help of an embedded channel.

A further object is to provide a method for supply of a prechamber gas through a single internal boring in the cylinder head, together with the embedded channel. This is a very simple method to establish this supply process, where a single boring can be drilled from the outside of the cylinder head, through the gas channel and into the centre of the cylinder where the prechamber is situated. Most gas engines need a separate gas supply to a prechamber where the ignition plug is placed, and where associated problems are avoided with the present invention.

With the mention of "gas" is meant fuel to the engine. The invention can be used for pure gas engines and "dual fuel engines" (engines that can run on diesel, gas or a mixture of these). A dual fuel engine also needs a gas supply system similar to that of a pure gas engine, and it will be possible to use the gas system according to the invention without essential adaptions on dual fuel engines as well.

SUMMARY OF THE INVENTION

The above mentioned object are achieved with a cylinder head for a combustion engine, where the cylinder head comprises one or more gas channels with a gas connection to receive gas and which is connected with one or more valves for control of gas supply and gas admission, where said one or more valves are fitted on or in the cylinder head. The cylinder head comprises an internal gas channel that runs from the gas connection and inside in the cylinder head to said one or more valves.

The gas channel can be one or more internal channels embedded in the cylinder head and which run from the gas connection and internally in the cylinder head to said one or more valves.

Alternatively, the gas channel can be one or more internal pipes embedded in the cylinder head and which run from the gas connection and internally in the cylinder head to said one or more valves.

A first part of the gas channel can be embedded in the cylinder head and run from the gas connection to a gas control valve. Correspondingly, a second part of the gas channel can be embedded into the cylinder head and run from the gas control valve to a gas admission valve.

Said one or more valves can thus comprise a gas control valve and a gas admission valve, which is fitted on or in machined borings in the cylinder head.

Said machined borings can be connected with respective first and second parts of the gas channel.

The gas supply is preferably an external connection in a lower part of the cylinder head.

The first part and the second part of the gas channel embedded in the cylinder head, and the gas control valve and gas admission valve can consequently make up a separate sub-system in the cylinder head.

In an alternative embodiment can said one or more valves for control of the gas supply and gas admission be integrated with each other.

The cylinder head according to the invention can comprise an internal boring, which is connected to the gas channel embedded in the cylinder head, where the internal boring runs into a prechamber in the cylinder head. The internal boring can comprise one or more control mechanisms to regulate the admission and flow of gas to the prechamber.

Said objects are also reached with a method for supply of prechamber gas in a cylinder head associated with a combustion engine, where the gas is led through an internal boring, which is connected to a gas channel integrated internally in the cylinder head and where the internal boring runs into a prechamber in the cylinder head.

Consequently, the gas can be led from an external gas connection via the integrated gas channel and to the internal boring.

Similarly, the internal boring can run from the outside of the cylinder head, through the gas channel and into the prechamber in the cylinder head.

DESCRIPTION OF THE FIGURES

Preferred embodiments of the invention shall, in the following, be described in more detail with reference to the enclosed figures, in which.

Figure 1:
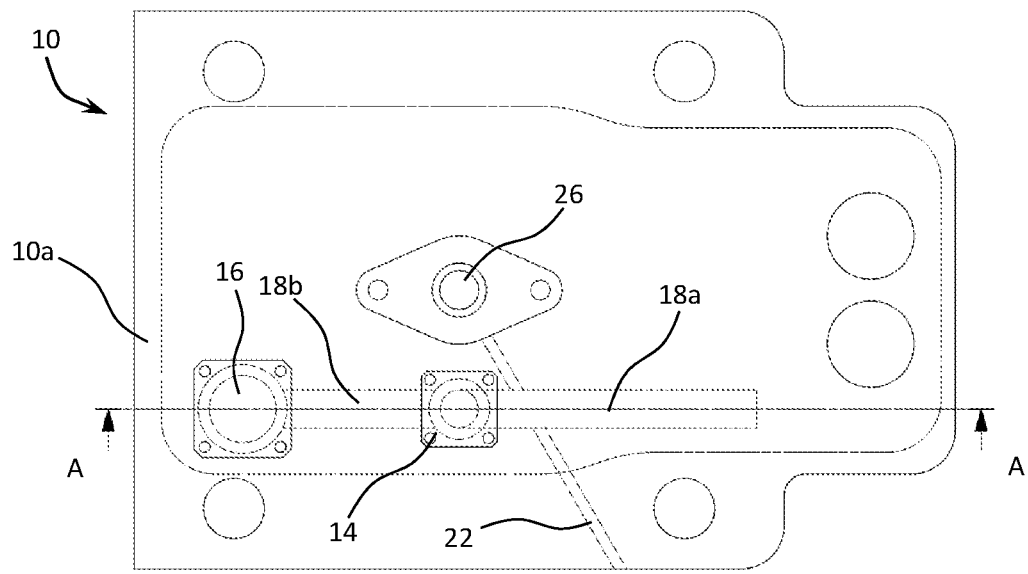
FIG. 1 shows a top view of a cylinder head according to the invention.
Figure 2:
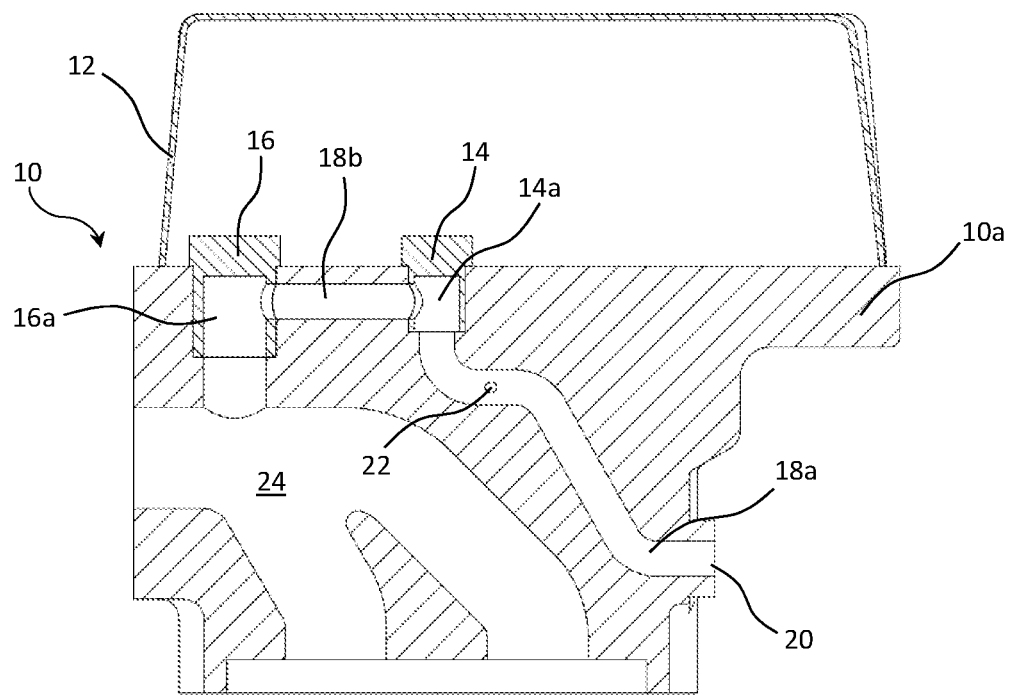
FIG. 2 shows a cross-section through the segment A-A shown in FIG. 1.
Figure 3:
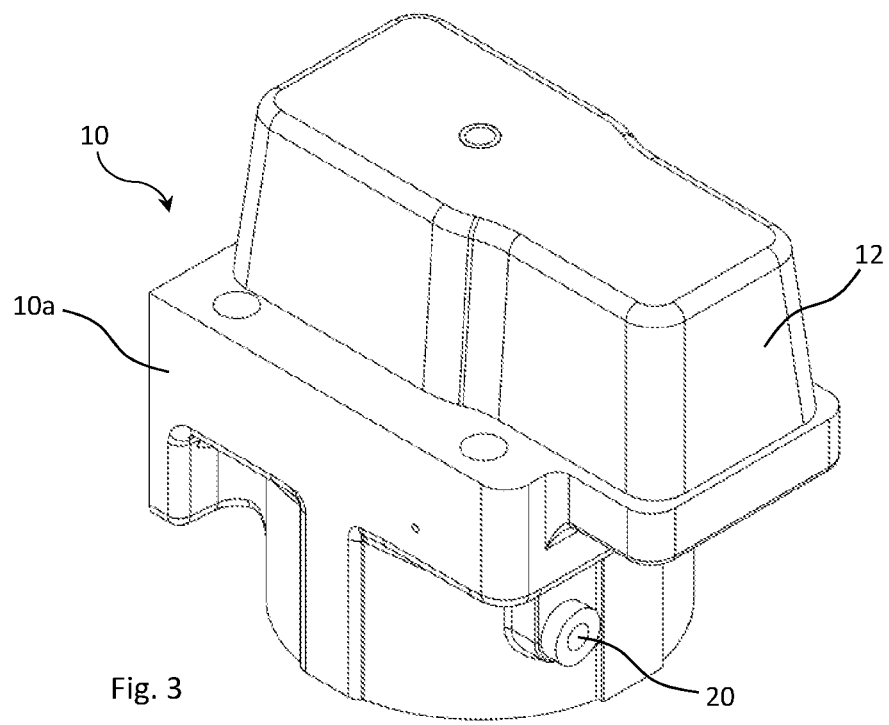
FIG. 3 shows in perspective the cylinder head according to the invention.

DESCRIPTION OF PREFERRED
EMBODIMENTS OF THE INVENTION

The invention relates to gas valves and feeding pipes that are integrated in a combustion engine, in particular the cylinder head 10 of a gas engine, as a separate sub-system with the help of an embedded channel, and which shall be explained with the help of the enclosed figures. The figures show the invention and associated components schematically.

As can be seen from the figures, a cylinder head 10 according to the invention comprises a cast house part 10a that is mounted to an engine block 30 that has cylinders, a piston and supply of fuel as is common in gas engines. Furthermore, the cylinder head 10 can be equipped with a cover 12 or enclosure.

In one embodiment, a separate gas control valve 14 and a gas admission valve 16 can be used, while in another embodiment a combination valve can be used for the functions of gas control and gas admission, respectively. Said valves can be activated in several different ways, for example mechanically, electrically, hydraulically, etc., without this being of major importance for the principle of the invention.

The cylinder head 10 comprises one or more gas channels 18a,18b with a gas connection 20 to receive gas and which are connected with one or more valves 14,16 for the control of the gas supply and gas admission. The gas channels 18a, 18b are preferably cast into the cylinder head 10 and run from the gas connection 20 and internally in the cylinder head 10 to said one or more valves 14,16.

Alternatively, the gas channel(s) 18a, 18b can be one or more internal pipes placed in the cylinder head 10 and which run correspondingly from the gas connection 20 and internally in the cylinder head 10 to said one or more valves 14,16.

In one specific embodiment, a first part 18a of the gas channel is embedded in the cylinder head 10 and runs from the gas connection 20 to the gas control valve 14, where the gas connection's 20 inlet is an external connection in a lower part of the cylinder head 10. A second part 18b of the gas channel is embedded in the cylinder head 10 and runs from the gas control valve 14 to the gas admission valve 16. In the case a of combined or integrated valve 14,16 as mentioned being used, there will only be a need for a single gas channel connected with the gas connection 20.

The gas control valve 14 and the gas admission valve 16 are fitted on or in respective machined borings 14a,16a in the cylinder head 10, where the boring 16a to the gas admission valve 16 is connected with a suction channel 24. Furthermore, said machined borings 14a,16a can be connected with the respective first and second parts 18a,18b of the gas channel. Alternatively, the gas control valve 14 and the gas admission valve 16 can be fitted onto or screwed onto a plane instead of a boring.

The gas channel or the channels 18a,18b are embedded in the housing part 10a during the casting of the cylinder head 10.

Figure 4:
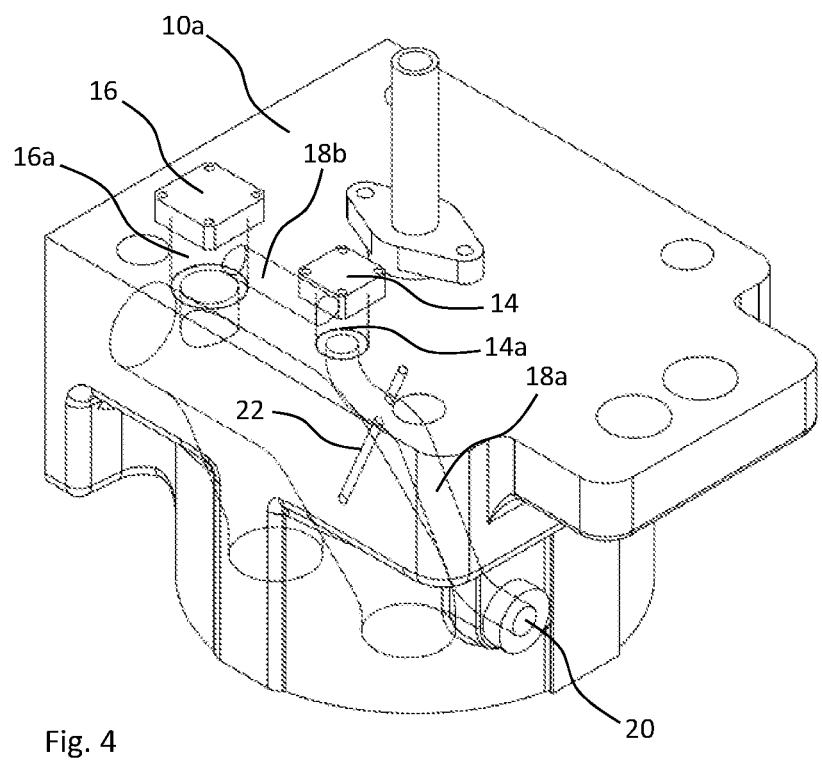
FIG. 4 shows an outline of the cylinder head according to the invention, without a cover, and with hidden channels.

Furthermore, the cylinder head 10 can comprise an internal boring 22 that is connected with the gas channel embedded in the cylinder head 10 that runs into a prechamber 26 in the cylinder head 10. With the use of a separate gas control valve 14 and gas admission valve 16 it will, in particular, be the first part 18a of the gas channel that is relevant for the connection with the internal boring 22. This is a very simple method to establish this supply. It can be drilled in one single boring from the outside of the cylinder head, such that the internal boring 22 runs from the outside of the cylinder head 10, through the gas channel 18a and into the prechamber 26 in the cylinder head 10, as shown by the dotted lines in FIGS. 1 and 4. The internal boring 22 can thus run to the centre of the cylinder where the prechamber 26 is placed and where a sparkplug associated with the prechamber is placed.

The gas is consequently led through the internal boring 22 that is connected with the gas channel 18a embedded in the cylinder head 10, i.e. that the gas is led from the external gas connection 20, via the embedded gas channel 18a and to the internal boring 22 before it is led further to the prechamber 26. The internal boring 22 can, if required, be equipped with one or more control mechanisms, such as dampers or valves to control the admission and flow of gas in the boring 22.

The embedded gas channel 18a,18b bind together the gas control valve 14 (regulating the amount of gas) with gas inlet and gas admission valve 16 (valve that releases gas into the cylinder). In this way, a compact, integrated gas system is obtained inside the cylinder head 10. The cost and risk for gas leaks to the surroundings are reduced compared to the "normal" design which, to a larger extent, is based on pipes and externally placed valves.

By casting a gas channel inside the cylinder head of a combustion engine, such as a gas engine or a dual fuel engine, much advanced welding with high cost and risk for mistakes is avoided. The casting operation has relatively much lower costs and reduced complexity.

Figure 5:
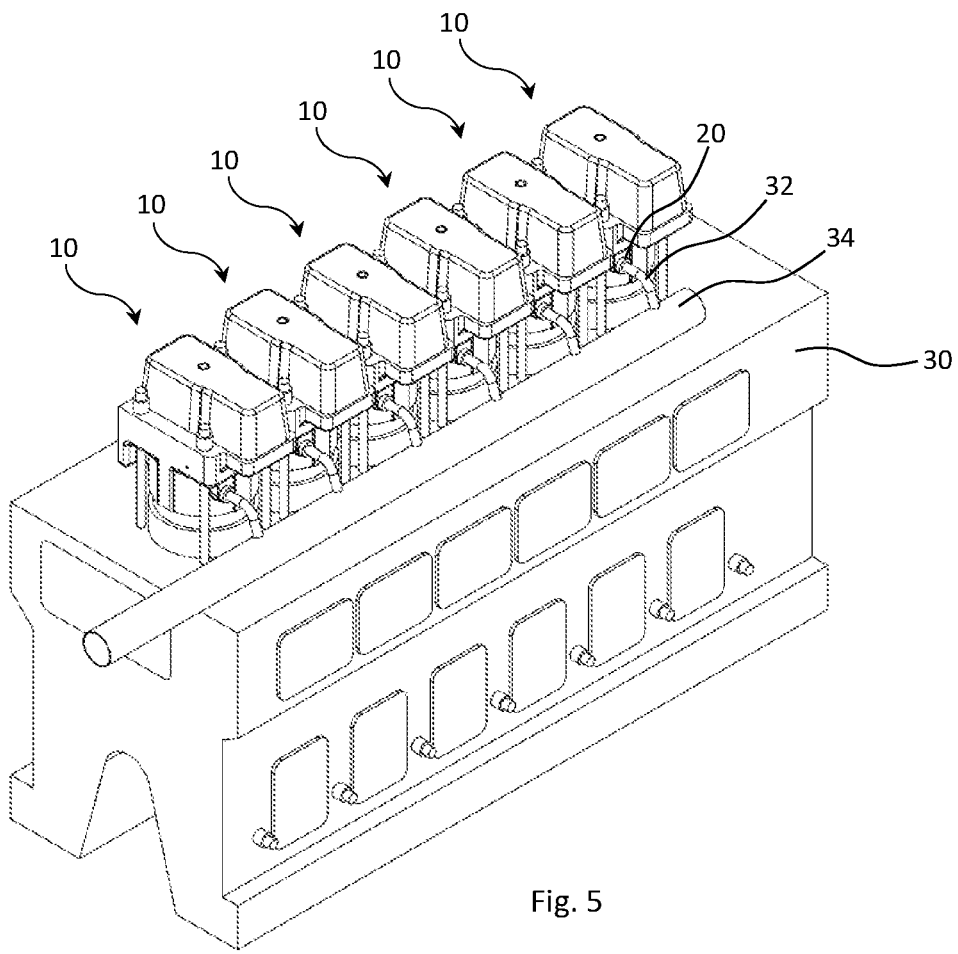
FIG. 5 shows in perspective an engine block equipped with several cylinder heads according to the invention.
Figure 6:
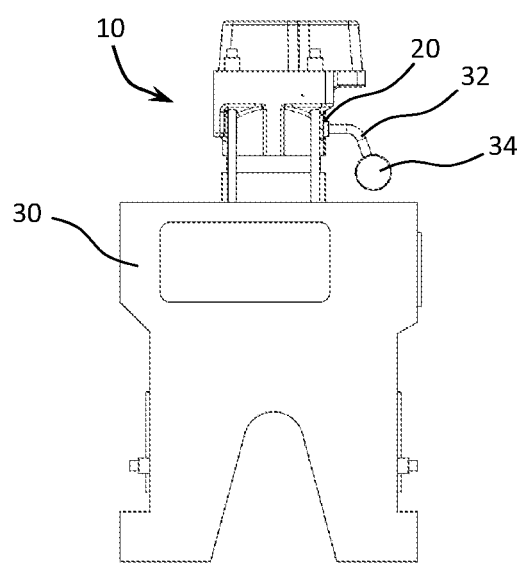
FIG. 6 shows an end view of the engine block in FIG. 5.

FIGS. 5 and 6 show an engine block 30 for a gas engine that is equipped with several cylinder heads 10 according to the invention. In the embodiment shown, six cylinder heads 10 are fitted onto the engine block 30. The gas connection 20 to each cylinder head 10 is, as shown, connected to a common gas supply pipe 34 via respective admission pipes 32.

The invention claimed is:

1. A cylinder head (10) for a combustion engine (30), where the cylinder head (10) comprises one or more gas channels (18a,18b) with a gas connection (20) to receive gas and which is connected with one or more valves (14,16) for control of gas supply and gas admission, where said one or more valves (14,16) are fitted on or in the cylinder head (10), and wherein the cylinder head (10) comprises an internal gas channel (18a,18b) that runs from the gas connection (20) and internally in the cylinder head (10) to said one or more valves (14,16), characterised in that:
   the gas connection (20) is an external connection in a lower part of the cylinder head (10); and
   a first part (18a) of the gas channel is embedded in the cylinder head (10) and runs from the gas connection (20) to a gas control valve (14) and a second part (18b) of the gas channel is embedded in the cylinder head (10) and runs from the gas control valve (14) to a gas admission valve (16).

2. The cylinder head (10) according to claim 1, in which the gas channel (18a,18b) is one or more internal channels embedded in the cylinder head (10), and that runs from the gas connection (20) and internally in the cylinder head (10) to said one or more valves (14,16).

3. The cylinder head (10) according to claim 1, in which the gas channel (18a,18b) is one or more internal pipes placed in the cylinder head (10) and that run from the gas connection (20) and internally in the cylinder head (10) to said one or more valves (14,16).

4. The cylinder head (10) according to claim 1, in which the gas control valve (14) and the gas admission valve (16) are fitted on or in machined borings (14a,16a) in the cylinder head (10).

5. The cylinder head (10) according to claim 4, in which said machined borings (14a,16a) are connected with respective first and second parts (18a,18b) of the gas channel.

6. The cylinder head (10) according to claim 1, in which the first part (18a) and the second part (18b) of the gas connection embedded in the cylinder head (10), and the gas control valve (14) and the gas admission valve (16), make up a separate sub-system in the cylinder head (10).

7. The cylinder head (10) according to claim 1, in which said one or more valves (14,16) for the control of the gas supply and gas admission are integrated with each other.

8. The cylinder head (10) according to claim 1, in which the cylinder head (10) comprises an internal boring (22), which is connected with the gas channel (18a) embedded in the cylinder head (10), where the internal boring (22) runs into a prechamber (26) in the cylinder head (10).

9. The cylinder head (10) according to claim 8, in which the internal boring (22) comprises one or more control mechanisms to control admission and flow of gas to the prechamber (26).

10. A method for supply of prechamber gas in a cylinder head (10) of a combustion engine, said cylinder head (10) comprises an internal gas channel (18a,18b), wherein a first part (18a) of the gas channel is embedded in the cylinder head (10) and runs from an external gas connection (20) to a gas control valve (14) and a second part (18b) of the gas channel is embedded in the cylinder head (10) and runs from the gas control valve (14) to a gas admission valve (16), in which gas is led through an internal boring (22) that is connected with the gas channel (18a) integrated internally in the cylinder head (10), where the internal boring (22) runs into a prechamber (26) in the cylinder head (10).

11. The method according to claim 10, in which the gas is led from the external gas connection (20), via the integrated gas channel (18a), and to the internal boring (22).

12. The method according to claim 10, in which the internal boring (22) runs from an outside of the cylinder head (10), through the gas channel (18a), and into the prechamber (26) in the cylinder head (10).

* * * * *